United States Patent
Tsuchiya (10) Patent No.: US 12,344,111 B2
(45) Date of Patent: Jul. 1, 2025

(54) POWER SUPPLY EQUIPMENT AND CONTROL METHOD OF POWER SUPPLY EQUIPMENT

(71) Applicant: TOYOTA JIDOSHA KABUSHIKI KAISHA, Toyota (JP)

(72) Inventor: Yoshiyuki Tsuchiya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 435 days.

(21) Appl. No.: 17/940,501

(22) Filed: Sep. 8, 2022

(65) Prior Publication Data

US 2023/0081955 A1    Mar. 16, 2023

(30) Foreign Application Priority Data

Sep. 10, 2021  (JP) ................. 2021-147899

(51) Int. Cl.
  *H02J 7/00*    (2006.01)
  *B60L 53/35*   (2019.01)

(52) U.S. Cl.
  CPC ............ *B60L 53/35* (2019.02); *H02J 7/0042* (2013.01)

(58) Field of Classification Search
  CPC ................................ B60L 53/31; B60L 53/35
  See application file for complete search history.

(56) References Cited

U.S. PATENT DOCUMENTS

2021/0053456 A1 *  2/2021  Freeling-Wilkinson ..................... B60L 53/18
2021/0086639 A1 *  3/2021  Rakuff ..................... B60L 53/31

FOREIGN PATENT DOCUMENTS

JP    5475407 B2    4/2014

* cited by examiner

*Primary Examiner* — Robert Grant
(74) *Attorney, Agent, or Firm* — Sughrue Mion, PLLC (57) ABSTRACT

A charging stand is power supply equipment that can supply electric power to an electrified vehicle on the ground and includes: a connector connected to an inlet of the electrified vehicle; a movable portion including a specific portion in which the connector is placed when the connector is not connected to the inlet and displaceable between a first position at which the specific portion is stored underground and a second position at which the specific portion is exposed on the ground; an actuator that displaces the movable portion; and a control device that controls the actuator and adjusts a position of the specific portion when the specific portion is exposed on the ground in accordance with a height of the inlet of the vehicle that is a power supply target.

6 Claims, 6 Drawing Sheets

POWER SUPPLY EQUIPMENT AND CONTROL METHOD OF POWER SUPPLY EQUIPMENT

CROSS-REFERENCE TO RELATED APPLICATION

This application claims priority to Japanese Patent Application No. 2021-147899 filed on Sep. 10, 2021, incorporated herein by reference in its entirety.

BACKGROUND

1. Technical Field

The present disclosure relates to power supply equipment and a control method of the power supply equipment, and particularly to power supply equipment that can supply electric power to a vehicle on the ground and a control method of the power supply equipment.

2. Description of Related Art

In the related art, there has been power supply equipment having a configuration in which a charging pole is embedded underground when the charging pole does not supply electric power (see, for example, U.S. Pat. No. 5,475,407 (JP 5475407 B)).

SUMMARY

A movable portion of the power supply equipment as in JP 5475407 B needs to be elevated when charging a vehicle. A height and a location of an inlet vary depending on a vehicle type of the vehicle. When the movable portion is elevated to a height that does not match the height of the inlet for each vehicle type during elevation of the movable portion, the movable portion may be elevated to a height that makes it difficult to insert a connecter into the inlet.

The present disclosure has been made to solve the above-mentioned issue, and an object thereof is to provide power supply equipment that makes it easier to insert the connector into the inlet and a control method of the power supply equipment.

Power supply equipment according to the present disclosure is power supply equipment that is able to supply electric power to a vehicle on a ground, and includes: a connector that is connected to an inlet of the vehicle, a movable portion including a specific portion in which the connector is placed when the connector is not connected to the inlet and displaceable between a position at which the specific portion is stored underground and a position at which the specific portion is exposed on the ground; an actuator that displaces the movable portion; and a control unit that controls the actuator. The control unit adjusts the position of the specific portion when the specific portion is exposed on the ground in accordance with a height of the inlet of the vehicle that is a power supply target.

With the configuration above, the height of the specific portion in which the connector of the movable portion of the power supply equipment is placed can be adjusted to a height at which the connector is easily connected to the inlet. As a result, it is possible to provide power supply equipment in which the connector can be easily inserted into the inlet.

The control unit may acquire the height of the inlet of the vehicle that is the power supply target, and adjust the position of the specific portion when the specific portion is exposed on the ground in accordance with the acquired height of the inlet.

With the configuration above, the height of the specific portion of the movable portion of the power supply equipment can be adjusted in accordance with the acquired height of the inlet of the vehicle that is the power supply target. As a result, the height of the specific portion can be adjusted accurately.

The control unit may adjust the position of the specific portion when the specific portion is exposed on the ground to a height that is substantially the same as the height of the inlet.

With the configuration above, the connector taken out from the specific portion of which height is adjusted to the height that is substantially the same as the height of the inlet can be connected to the inlet without changing the height. As a result, the connector can be more easily inserted into the inlet.

The control unit may acquire information related to a height of a hand of a user of the vehicle, and adjust the position of the specific portion when the specific portion is exposed on the ground in accordance with the acquired height of the hand of the user in addition to the height of the inlet.

With the configuration above, the height of the specific portion of the movable portion of the power supply equipment can be adjusted in accordance with the acquired height of the hand of the user in addition to the acquired height of the inlet. As a result, the height of the specific portion can be accurately adjusted in consideration of the height of the hand of the user.

The control unit may adjust the position of the specific portion when the specific portion is exposed on the ground to a height between the height of the inlet and the height of the hand of the user.

With the configuration above, the connector taken out from the specific portion of which height is adjusted to the height between the height of the inlet and the height of the hand of the user can be connected to the inlet while the height of the connector is maintained within the range between the height of the inlet and the height of the hand of the user. As a result, the connector can be more easily inserted into the inlet in consideration of the height of the hand of the user.

According to another aspect of the present disclosure, a control method of power supply equipment is a control method of power supply equipment that is able to supply electric power to a vehicle on a ground. The power supply equipment includes a connector that is connected to an inlet of the vehicle, a movable portion including a specific portion in which the connector is placed when the connector is not connected to the inlet and displaceable between a position at which the specific portion is stored underground and a position at which the specific portion is exposed on the ground, an actuator that displaces the movable portion, and a control unit that controls the actuator. The control method includes: a step in which the control unit acquires a height of the inlet of the vehicle that is a power supply target; and a step in which the control unit adjusts a position of the specific portion when the specific portion is exposed on the ground in accordance with the acquired height of the inlet.

With the configuration above, it is possible to provide the control method of the power supply equipment in which the connector can be easily inserted into the inlet.

According to the present disclosure, it is possible to provide the power supply equipment in which the connector can be easily inserted into the inlet and the control method of the power supply equipment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. In the drawings, the same or corresponding portions are denoted by the same reference signs and the description thereof will not be repeated.

Figure 1:
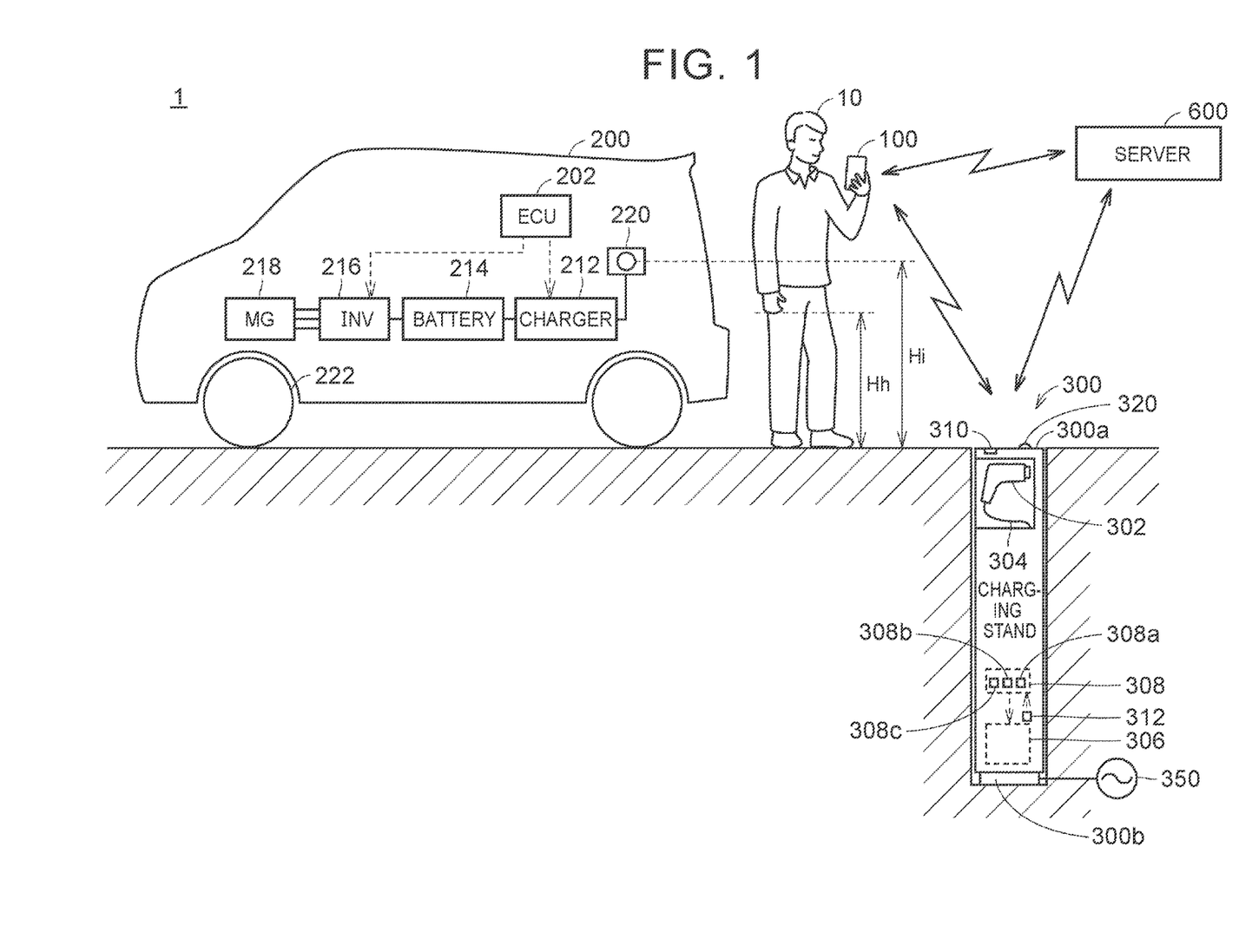
FIG. 1 is a diagram showing an example of a configuration of an electrified vehicle and a charging stand in a state where a movable portion is stored underground.
Figure 2:
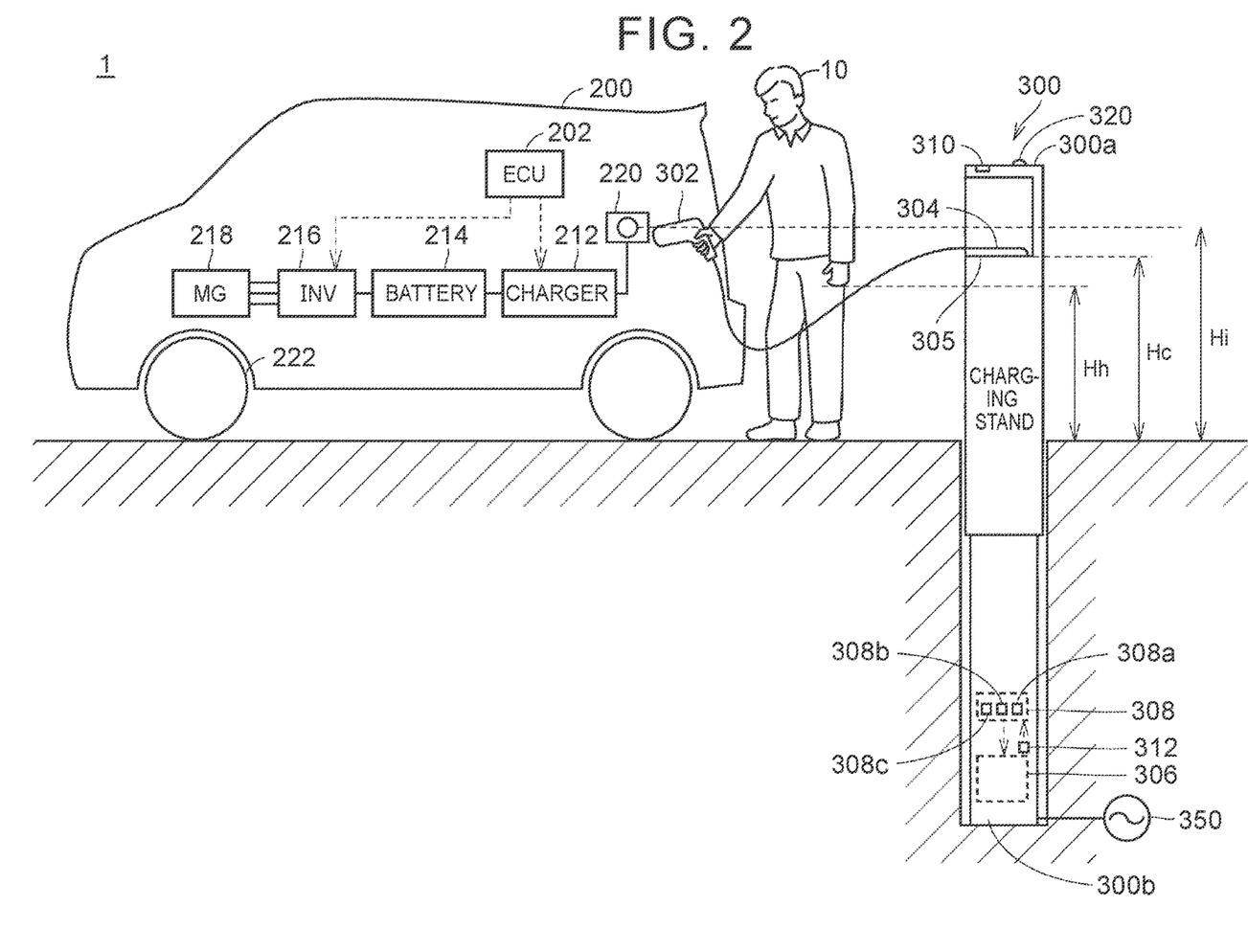
FIG. 2 is a diagram showing an example of the configuration of the electrified vehicle and the charging stand in a state where the movable portion is exposed on the ground.

Hereinafter, a configuration of a charging stand 300 that is charging equipment according to the embodiment of the present disclosure will be described as an example. FIG. 1 is a diagram showing an example of a configuration of an electrified vehicle 200 and the charging stand 300 in a state where a movable portion 300a (that will be described later) is stored underground. FIG. 2 is a diagram showing an example of the configuration of the electrified vehicle 200 and the charging stand 300 in a state where the movable portion 300a is exposed on the ground.

As shown in FIGS. 1 and 2, in a power supply system 1, the charging stand 300 is configured such that the charging stand 300 can be elevated and lowered between a lower limit state (see FIG. 1) in which the position of an upper end of the charging stand 300 is substantially flush with the ground and the movable portion 300a is stored underground, and a upper limit state (see FIG. 2) in which the upper end is elevated to a predetermined position above the ground and the movable portion 300a is exposed on the ground.

The charging stand 300 includes, for example, a cylindrical housing and is installed on the bottom surface of a recess provided in the ground. The recess provided in the ground is formed so as to have a predetermined gap with the outer peripheral surface of the housing of the charging stand 300. The depth of the recess is set to be approximately the same as the vertical length of the charging stand 300 in the lower limit state.

The charging stand 300 includes the movable portion 300a and a fixed portion 300b. A storage space 305 capable of storing a connector 302 is provided in the upper portion of the movable portion 300a. One end of a cable 304 is connected to the connector 302. The other end of the cable 304 is connected to a power supply circuit (not shown). A power supply circuit is configured to be supplied with alternating current (AC) power from a power source 350 and supply electric power to the movable portion 300a (more specifically, the cable 304). The power source 350 is, for example, an AC power source configured by a commercial power source or the like. The cable 304 includes, for example, an extensible portion in terms of shape provided with a curl portion or an extensible portion in terms of structure provided with a reeling structure. The cable 304 is configured to be extensible to an inlet 220 of the electrified vehicle 200 parked in the parking space when the connector 302 is taken out.

The movable portion 300a is provided with a contact sensor 310 and a notification lamp 320. The contact sensor 310 is a detection device for detecting that an object (for example, a person, a living thing, or an object) is in contact with the movable portion 300a of the charging stand 300, and is configured by, for example, an electrostatic sensor. The electrostatic sensor detects the object based on a change in capacitance when the object enters the electric field generated by the electrostatic sensor. Multiple electrostatic sensors are provided in respective portions of the movable portion 300a when the electrostatic sensors are necessary for detecting a contact of the object with portions to be detected (for example, the upper surface and the side surface) of the movable portion 300a. That is, the contact sensor 310 is composed of one or more electrostatic sensors. When the contact sensor 310 detects that the object is in contact with the movable portion 300a, the contact sensor 310 transmits a signal indicating that the object is in contact with the movable portion 300a to a control device 308. Note that, the contact sensor 310 is not limited to the above as long as the contact sensor 310 can detect that the object is in contact with the movable portion 300a, and may be another type of sensor. The contact sensor 310 is provided so as to suppress erroneous detection of the contact with the object.

The notification lamp 320 is composed of a light emitting device, for example, a multicolor light emitting diode (LED), and is controlled by the control device 308 to be visibly turned on, blinked, or turned off by a person around the charging stand 300. For example, the notification lamp 320 may be controlled to blink in green during charging or to light in blue when charging is completed. Further, the notification lamp 320 may be controlled to light or blink in red when a contact of the object is detected.

The fixed portion 300b is fixed to the bottom surface of the recess provided in the ground. Note that, the fixed portion 300b is not particularly limited to being fixed to the bottom surface of the recess, as long as the fixed portion 300b is fixed to any portion in the recess provided in the ground.

The fixed portion 300b includes an elevating device 306 that elevates and lowers the movable portion 300a in an up-down direction, a control device 308 that controls an operation of the elevating device 306, and a movement amount sensor 312.

The elevating device 306 includes an actuator for elevating and lowering the movable portion 300a. The elevating device 306 may include, for example, a rack and pinion type mechanism, a mechanism using a hydraulic cylinder or a pneumatic cylinder, or a mechanism using a magnetic force. The rack and pinion type mechanism elevates and lowers the movable portion 300a by rotating a pinion gear meshed with a rack gear fixed to the movable portion 300a using an electric actuator. The hydraulic cylinder or the pneumatic cylinder elevates and lowers the movable portion 300a by fixing a rod connected to the piston to the movable portion 300a and increasing or decreasing the hydraulic pressure or the pneumatic pressure supplied to the cylinder body fixed to the fixed portion 300b. The mechanism using the magnetic force generates a repulsive force between the movable portion 300a and the fixed portion 300b by the magnetic force to elevate and lower the movable portion 300a.

The elevating device 306 is configured such that the movable portion 300a is not lowered beyond the position corresponding to the lower limit state by, for example, a stopper mechanism or the like, and is not elevated beyond the position corresponding to the upper limit state.

The movement amount sensor 312 detects a movement amount of the movable portion 300a. The movement amount sensor 312 detects, for example, an elevating and lowering amount of the movable portion 300a by the elevating device 306 as the movement amount of the movable portion 300a. The movement amount sensor 312 transmits a signal indicating the detected movement amount of the movable portion 300a to the control device 308. The movement amount sensor 312 may detect a state quantity corresponding to the elevating and lowering amount such as an actuator operating amount, and the control device 308 may acquire the elevating and lowering amount from the detected state quantity.

The control device 308 includes a central processing unit (CPU) 308a, a memory 308b composed of a read only memory (ROM), a random access memory (RAM), and the like, and a communication unit 308c capable of communicating with an external device. The control device 308 controls an electrical appliance (for example, the elevating device 306) provided in the charging stand 300 based on information stored in the memory 308b, information received via the communication unit 308c, information acquired from the contact sensor 310, information acquired from the movement amount sensor 312, and/or information acquired from other sensors (not shown). Note that, the control above is not limited to the configuration in which the process executed by the software is executed by the CPU 308a, and the configuration may be constructed by dedicated hardware (an electronic circuit).

The communication unit 308c is configured to be capable of communicating various types of information and the like with an external device of the charging stand 300. In the present embodiment, the communication unit 308c is configured to be capable of wirelessly communicating with the server 600 that manages a plurality of the charging stands 300. Further, the communication unit 308c is configured to be capable of communicating with, for example, a communication instrument 100 carried by a user 10 of the electrified vehicle 200. The communication instrument 100 is, for example, a mobile terminal such as a smartphone or a tablet. The communication between the communication unit 308c and the communication instrument 100 may be, for example, short-range wireless communication. That is, the communicable distance between the communication unit 308c and the communication instrument 100 is shorter than the communicable distance between the communication unit 308c and the server 600.

For example, when an execution condition of elevating control (hereinafter, also referred to as "elevating condition") is satisfied, the control device 308 executes the elevating control on the elevating device 306 such that the charging stand 300 is switched from the lower limit state to the upper limit state. The execution condition of the elevating control includes, for example, a condition that the charging stand 300 is not in the upper limit state and a condition that an execution request for the elevating control (hereinafter, also referred to as an "elevating request") is received from the server 600. The server 600 transmits, for example, the elevating request to the charging stand 300 when the start time included in the usage reservation of the charging stand 300 approaches.

Further, for example, when an execution condition of lowering control is satisfied, the control device 308 executes the lowering control on the elevating device 306 such that the charging stand 300 is switched from the upper limit state to the lower limit state. The execution condition of the lowering control includes, for example, a condition that the charging stand 300 is not in the lower limit state and a condition that an execution request for the lowering control (hereinafter, also referred to as a "lowering request") is received from the server 600. Note that, instead of the condition that the lowering request is received, a condition that charging of the electrified vehicle 200 (specifically, a battery 214 described later) is completed may be adopted. The completion of charging may mean, for example, that the connector 302 and the inlet 220 of the electrified vehicle 200 are disconnected from each other and the connector 302 is returned to a predetermined position.

FIGS. 1 and 2 further show an example of the configuration of the electrified vehicle 200 parked in a parking space where the electrified vehicle 200 can be charged by the charging stand 300. As shown in FIGS. 1 and 2, the electrified vehicle 200 includes, for example, a vehicle equipped with a power storage device, such as a plug-in hybrid electric vehicle (also referred to as "PHEV") and a battery electric vehicle (also referred to as "BEV"). Note that, the configuration of the electrified vehicle 200 is not particularly limited to the vehicles listed above, as long as the electrified vehicle 200 has a configuration capable of receiving supply of electric power from the charging stand 300. For example, the electrified vehicle 200 may be a vehicle equipped with a power storage device for external power supply.

The electrified vehicle 200 includes an electronic control unit (ECU) 202, a charger 212, the battery 214, an inverter 216, a motor generator 218, and the inlet 220.

The ECU 202 includes a CPU and a memory composed of a ROM, RAM, and the like. The ECU 202 controls electrical appliances (for example, the charger 212 and the inverter 216) provided in the electrified vehicle 200 based on the information stored in the memory and the information acquired from the sensors (not shown).

When the AC power is supplied from the inlet 220, the charger 212 converts the supplied AC power into direct current (DC) power and supplies the converted DC power to the battery 214. The battery 214 is charged by operating the charger 212. The charger 212 is controlled based on, for example, a control signal from the ECU 202.

The battery 214 is, for example, a rechargeable power storage element, and is typically a secondary battery such as a nickel metal hydride battery or a lithium ion battery containing a liquid or solid electrolyte. Alternatively, the battery 214 may be any power storage device capable of storing electric power, and for example, a large-capacity capacitor may be used instead of the battery 214.

The inverter 216 converts, for example, the DC power of the battery 214 into the AC power and supplies the converted AC power to the motor generator 218. Further, the inverter 216 converts, for example, the AC power (regenerative power) from the motor generator 218 into the DC power and supplies the converted DC power to the battery 214 to charge the battery 214.

The motor generator 218 receives supply of electric power from the inverter 216 and applies a rotational force to drive wheels 222. The drive wheels 222 are each rotated by a rotational force applied by the motor generator 218 to cause the electrified vehicle 200 to travel.

The inlet 220 is provided on the exterior portion of the electrified vehicle 200 together with a cover (not shown) such as a lid. The inlet 220 is a power receiving unit that receives charging power from external charging equipment (for example, the charging stand 300). The inlet 220 has a shape to which the connector 302 of the charging stand 300 can be attached. A contact is included in each of the inlet 220 and the connector 302. When the connector 302 is attached to the inlet 220, the contacts come into contact with each other, and the inlet 220 and the connector 302 are electrically connected. At this time, the battery 214 of the electrified vehicle 200 is in a state where the battery 214 can be charged using the electric power supplied from the charging stand 300.

Figure 3:
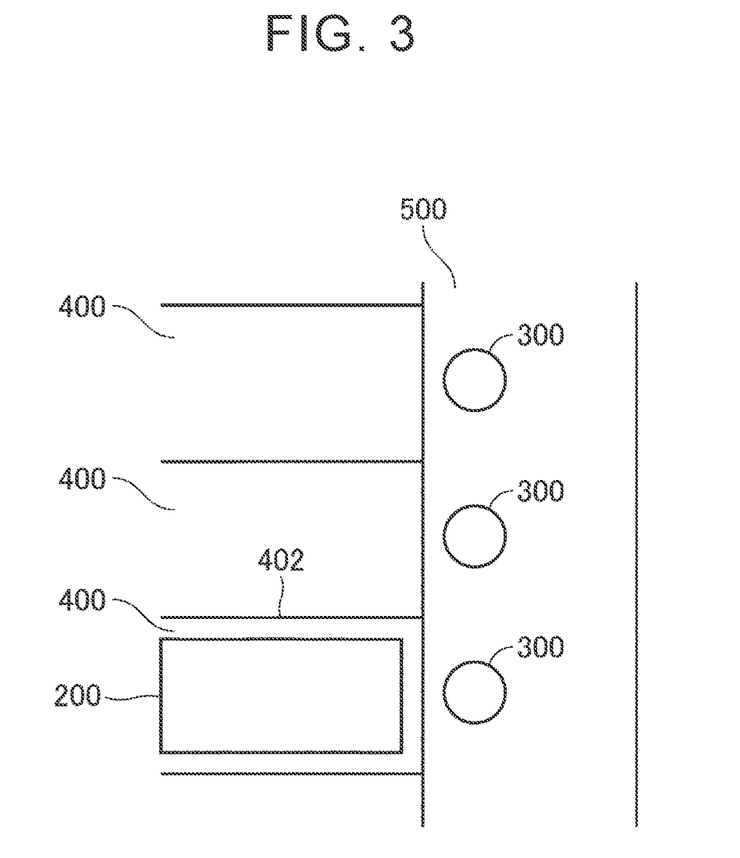
FIG. 3 is a diagram showing an example of a layout of the charging stands and parking spaces.

FIG. 3 is a diagram showing an example of the layout of the charging stands 300 and parking spaces 400. With reference to FIG. 3, in this example, the multiple parking spaces 400 are partitioned by partition lines 402 so as to be arranged side by side in the parking lot. Further, a sidewalk 500 is provided along the lateral direction (direction orthogonal to the longitudinal direction) of the parking spaces 400. The sidewalk 500 is adjacent to each parking space 400. The charging stand 300 is installed at a position adjacent to each parking space 400 on the sidewalk 500. The charging stand 300 is provided for each parking space 400. The charging stands 300 are lined up along the sidewalk 500.

Figure 4:
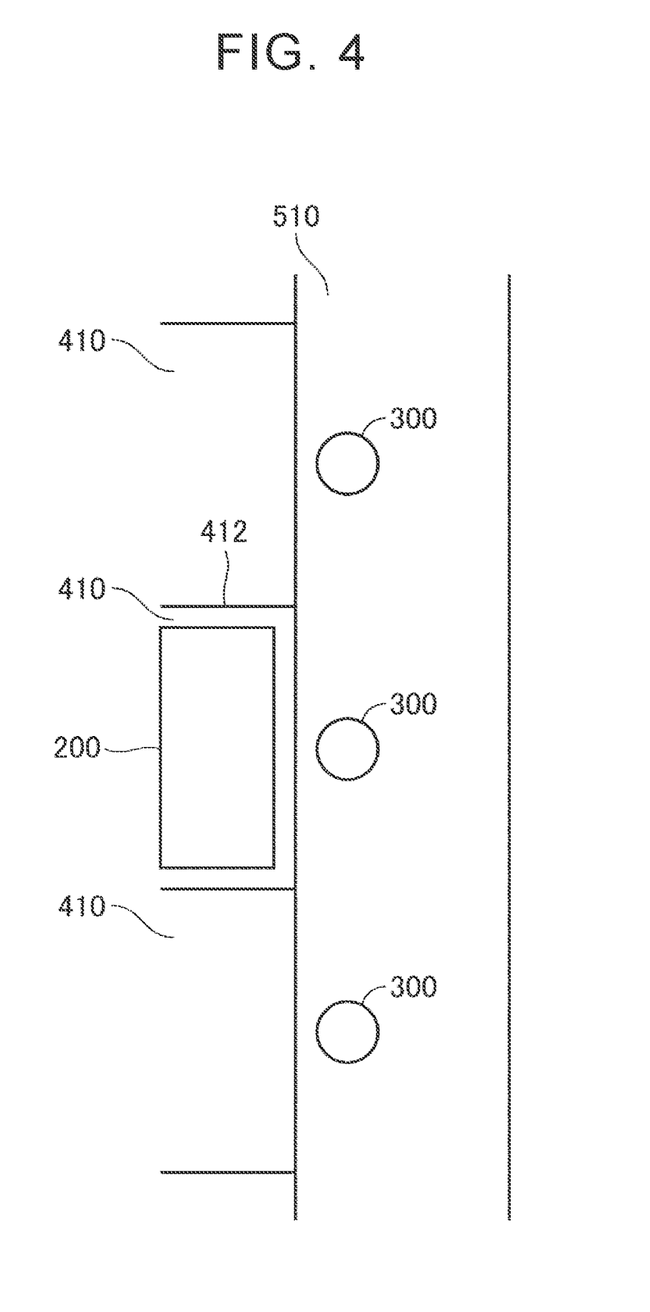
FIG. 4 is a diagram showing another example of the layout of the charging stands and parking spaces.

FIG. 4 is a diagram showing an example of the layout of the charging stands 300 and parking spaces 410. With reference to FIG. 4, in this example, the multiple parking spaces 410 are partitioned by partition lines 412 so as to be arranged tandem in the parking lot. Further, a sidewalk 510 is provided along the longitudinal direction of the parking spaces 410. The sidewalk 510 is adjacent to each parking space 410. The charging stand 300 is installed at a position adjacent to each parking space 410 on the sidewalk 510. The charging stand 300 is provided for each parking space 410. The charging stands 300 are lined up along the sidewalk 510.

The user 10 parks the electrified vehicle 200 in any of the parking spaces 400 or the parking spaces 410, and when the charging stand 300 is in the upper limit state, the user 10 takes out the connector 302 from the closest charging stand 300 and connects the connector 302 to the inlet 220 of the electrified vehicle 200. With the above, the electrified vehicle 200 can be charged from the charging stand 300.

With reference to FIGS. 1 and 2 again, the server 600 is configured to include a control device, a storage device, and a communication device (none of which is shown). The control device includes a processor, and is configured to execute predetermined information processing. The storage device is configured to be able to store various types of information. The communication device includes various communication interfaces. The communication device is configured to be capable of communicating with each of the communication instrument 100 and the charging stand 300, and the control device is configured to communicate with the communication instrument 100 and the charging stand 300 via the communication device. That is, the server 600 is configured to be capable of communicating with each of the communication instrument 100 and the charging stand 300.

A plurality of users of the electrified vehicles 200 and the charging stands 300 are registered in the server 600. Further, the communication instrument 100 carried by the user 10 is also registered in the server 600 together with the user 10. The server 600 is configured to manage information on each registered user 10 (hereinafter, also referred to as "user information") and information on each registered charging stand (hereinafter, also referred to as "stand information"). Information related to the communication instrument is included in the user information. Further, the user information may include information on the electrified vehicle 200 owned by each user 10 (for example, specification information related to charging). The user information and the stand information are stored in the storage device of the server 600.

Identification information for identifying the user 10 (hereinafter, also referred to as "user ID") is assigned to each user 10, and the server 600 manages the user information by distinguishing the user information by the user ID. The user ID also functions as information for identifying the communication instrument 100 (instrument ID). The user information includes, for example, communication address of the communication instrument 100 carried by the user 10, and information for identifying the electrified vehicle 200 belonging to the user 10 (vehicle ID).

The communication instrument 100 is a mobile terminal carried by the user 10 of the electrified vehicle 200. As the communication instrument 100, a smartphone, a tablet terminal, or a wearable device (for example, a smart watch) can be adopted.

The communication instrument 100 is configured to be capable of wirelessly communicating with each of the charging stand 300 and the server 600. Predetermined application software (hereinafter, simply referred to as "application") is installed in the communication instrument 100. The communication instrument 100 is carried by the user 10 of the electrified vehicle 200, and can transmit and receive information to and from each of the charging stand 300 and the server 600 through the above application. The user 10 can operate the above application through, for example, the touch panel display of the communication instrument 100.

The user 10 can reserve the charging stand 300 by communicating with the server 600 through the application and inputting the reservation information. The reservation information includes information for identifying the charging stand and the charging start time. The server 600 that receives the reservation information from the communication instrument 100 transmits the elevating request to the charging stand 300. The server 600 may transmit the elevating request to the charging stand 300 at a timing when a predetermined time before the charging start time arrives. The elevating request includes the user ID (instrument ID) of the user 10 who has made a reservation for the charging stand 300.

Figure 5:
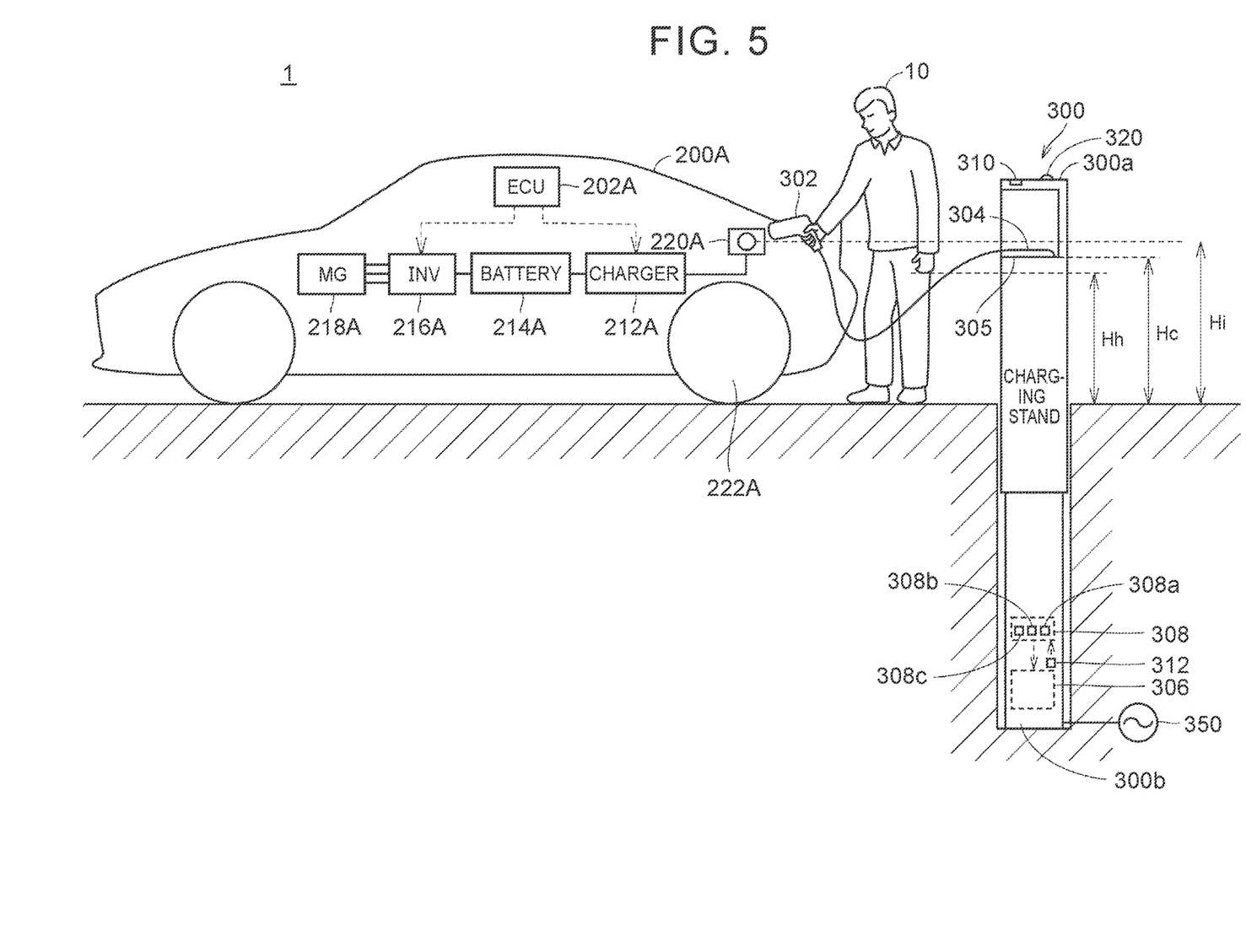
FIG. 5 is a diagram showing an electrified vehicle of different vehicle type and the charging stand in the state where the movable portion is exposed on the ground.

FIG. 5 is a diagram showing an example of the configuration of an electrified vehicle 200A of different vehicle type and the charging stand 300 in a state where the movable portion 300a is exposed on the ground. With reference to FIG. 2 again and with reference to FIG. 5, the configuration of the electrified vehicle 200A in FIG. 5 is the same as the configuration of the electrified vehicle 200 described with reference to FIGS. 1 and 2. Therefore, the duplicate description will not be repeated. The movable portion 300a of the charging stand 300 needs to be elevated when the electrified vehicles 200, 200A are charged. The height and location of the inlets 220, 220A differ depending on the vehicle type (or model) of the electrified vehicles 200, 200A. When the movable portion 300a is elevated to a height that does not match the height of the inlets 220, 220A for respective vehicle types during elevation of the movable portion 300a, the movable portion 300a may be elevated to a height that makes it difficult to insert the connecter 302 into the inlets 220, 220A.

Therefore, the control device 308 adjusts the position of the storage space 305 of the connector 302 of the charging stand 300 when the movable portion 300a is exposed on the ground in accordance with the height of the inlets 220, 220A of the electrified vehicles 200, 200A that are the power supply targets.

With the above, the height of the storage space 305 in which the connector 302 of the movable portion 300a of the charging stand 300 is placed can be adjusted to a height at which the connector 302 is easily connected to the inlets 220, 220A. As a result, the connector 302 can be easily inserted into the inlets 220, 220A.

Figure 6:
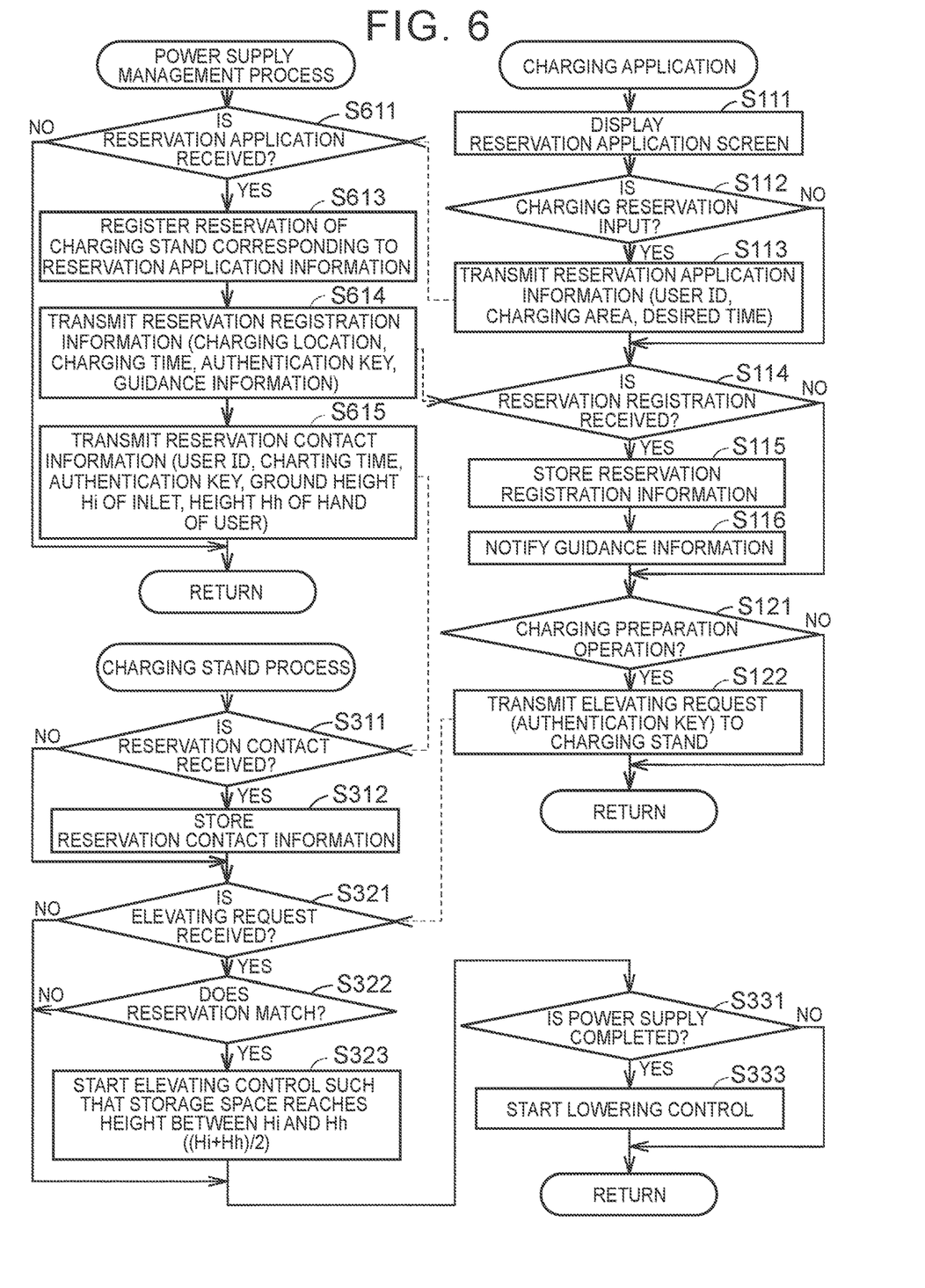
FIG. 6 is a flowchart showing a flow of processes for power supply in the present embodiment.

FIG. 6 is a flowchart showing a flow of processes for power supply in the present embodiment. A power supply management process, among the processes for power supply, is called from the upper-level process and executed by the control device of the server 600 at predetermined intervals. Among the processes for power supply, a charging application is called from the upper-level process and executed by the CPU of the communication instrument 100 at predetermined intervals. A charging stand process, among the processes for power supply, is called from the upper-level process and executed by the control device 308 of the charging stand 300 at predetermined intervals.

With reference to FIG. 6, the charging application is executed in the communication instrument 100. In the charging application, the CPU of the communication instrument 100 displays an application screen on the touch panel display for making a reservation for power supply to the electrified vehicle 200 (step S111).

Next, on the application screen, the CPU of the communication instrument 100 determines whether an input of the contents related to the charging reservation (for example, the user ID, the desired area of charging, and the desired time of charging) is detected on the touch panel display (step S112). When the CPU of the communication instrument 100 determines that the charging reservation is input (YES in step S112), the CPU transmits reservation application information (for example, information including the user ID, the charging area, and the charging time) to the server 600 (step S113).

In the power supply management process, the control device of the server 600 determines whether the reservation application information is received from the communication instrument 100 (step S611). When the control device of the server 600 determines that the reservation application information is received (YES in step S611), the control device registers information related to the reservation of the charging stand 300 corresponding to the desired area of charging indicated in the reservation application information (for example, the user ID, the charging start time, the scheduled charging end time, and information including an authentication key for the charging) to the storage device (step S613).

Then, the control device of the server 600 transmits reservation registration information (for example, the location of the reserved charging stand 300, the time related to charging such as the charging start time and the scheduled charging end time, the authentication key, and guidance information) to the communication instrument 100 of the user 10 who has made the reservation (step S614). The guidance information includes information including videos and images for guiding the user 10 on how to operate the charging stand 300, and information for guiding the user 10 to the reserved charging stand 300 using the navigation system.

Further, the control device of the server 600 transmits reservation contact information (for example, the user ID of the user 10 who has made the reservation, the time related to charging such as the charging start time and the scheduled charging end time, the authentication key, a ground height Hi of the inlet 220 of the electrified vehicle 200 of the user 10, and a height Hh of the hand of the user 10) to the reserved charging stand 300 (step S615). The ground height Hi of the inlet 220 of the electrified vehicle 200 of the user 10 and the height Hh of the hand of the user 10 (see FIGS. 2 and 5) are registered in advance in the storage device of the server 600 by the user 10.

When the control device of the server 600 determines that the reservation application information is not received (NO in step S611), or after step S615, the control device returns the process to be executed to the upper-level process of the caller of the power supply management process.

When the CPU of the communication instrument 100 determines that the charging reservation is not input (NO in step S112), or after step S113, the CPU determines whether the reservation registration information is received from the server 600 (step S114). When the CPU of the communication instrument 100 determines that the reservation registration information is received (YES in step S114), the CPU stores the received reservation registration information in the memory (step S115).

Then, the CPU of the communication instrument 100 notifies the user 10 of the guidance such as how to operate the charging stand 300 indicated by the guidance information, and registers information for guiding the user 10 to the charging stand 300 indicated by the guidance information in the navigation system (step S116). The user 10 of the electrified vehicle 200 can operate the charging stand 300 in accordance with the guidance. Further, the user 10 of the electrified vehicle 200 can reach the charging stand 300 in accordance with the guidance of the navigation system.

When the CPU of the communication instrument 100 determines that the reservation registration information is not received (NO in step S114), or after step S116, the CPU determines whether a charging preparation operation is detected on the touch panel display (step S121). When the CPU of the communication instrument 100 determines that the charging preparation operation is detected (YES in step S121), the CPU transmits the elevating request for the movable portion 300a including the authentication key and the user ID stored in the memory to the charging stand 300 (step S122).

When the CPU of the communication instrument 100 determines that the charging preparation operation is not detected (NO in step S121), or after step S122, the CPU returns the process to be executed to the upper-level process of the caller of the charging application.

In the charging stand process, the CPU 308a of the control device 308 of the charging stand 300 determines whether the reservation contact information is received from the server 600 (step S311). When the CPU 308a determines that the reservation contact information is received (YES in step S311), the CPU 308a stores the received reservation contact information in the RAM of the memory 308b (step S312).

When the CPU 308a determines that the reservation contact information is not received (NO in step S311), or after step S312, the CPU 308a determines whether the elevating request is received from the communication instrument 100 (step S321). When the CPU 308a determines that the elevating request is received (YES in step S321), the CPU 308a determines whether the reservation contact information including an authentication key matching the authentication key included in the received elevating request is stored in the memory 308b (step S322).

When the CPU 308a determines that the reservation contact information including the authentication key matching the received authentication key is stored (YES in step S322), the CPU 308a controls the elevating device 306 so as to start the elevating control of the movable portion 300a (step S323). The reservation contact information stored in the memory 308b includes the height Hi of the inlets 220, 220A and the height Hh of the hand of the user 10. In the elevating control, an actuator of the elevating device 306 is controlled such that a height Hc of the storage space 305 equals to a height between the height Hi and the height Hh, that is, (Hi+Hh)/2 (see FIGS. 2 and 5). When the height Hc of the storage space 305 reaches (Hi+Hh)/2, the elevating device 306 is controlled so as to end the elevating control of the movable portion 300a.

When the elevating control of the movable portion 300a ends, the user 10 connects the connector 302 of the charging stand 300 to the inlets 220, 220A of the electrified vehicles 200, 200A, and operates the charging stand 300 so as to start power supply to the electrified vehicles 200, 200A. When charging is completed, power supply to the electrified vehicles 200, 200A is stopped. Upon confirming that the power supply is stopped, the user 10 removes the connector 302 from the inlets 220, 220A and returns the connector 302 to the charging stand 300.

The CPU 308a determines whether charging is completed by determining whether the connector 302 is removed from the inlets 220, 220A and is returned to the charging stand 300 (step S331). When the CPU 308a determines that charging is completed (YES in step S331), the CPU 308a controls the elevating device 306 so as to start the lowering control of the movable portion 300a (step S333). When the movable portion 300a reaches a position corresponding to the lower limit state in which the power supply portion of the movable portion 300a is housed underground, the elevating device 306 is controlled so as to end the lowering control.

When charging is not completed (NO in step S331), the elevating device 306 is controlled so as to maintain the movable portion 300a at the position corresponding to the upper limit state. After that, or after step S333, the CPU 308a returns the process to be executed to the upper-level process of the caller of the charging stand process.

Modification (1) In the above-described embodiment, as shown in FIG. 1, the cable 304 of the charging stand 300 is always connected to the power supply circuit of the charging stand 300. However, the present disclosure is not limited to this, and a configuration in which the movable portion 300a of the charging stand 300 is provided with a connection portion for connecting the cable 304, and the other end of the cable 304 of which one end is provided with the connector 302 can be connected to the connection portion may be adopted.

(2) In the above-described embodiment, as shown in FIG. 5, charging is reserved from the communication instrument 100 of the user 10 to the charging stand 300 via the server 600. However, the present disclosure is not limited to this, and the communication instrument 100 of the user 10 may be configured such that the user 10 can directly make a reservation for charging with the charging stand 300.

(3) In the above-described embodiment, as shown in FIG. 1, the electric power supplied from the charging stand 300 to the electrified vehicle 200 is AC power. However, the electric power supplied is not limited to this, and may be DC power.

(4) In the above-described embodiment, as shown in step S323 in FIG. 6, the elevating control is executed such that the height Hc of the storage space 305 is equal to an average height of the height Hi of the inlets 220, 220A and the height Hh of the hand of the user 10, that is, (Hi+Hh)/2. However, the height Hc of the storage space 305 reached in the elevating control is not limited to this, and is desirable to be a height between the height Hi of the inlets 220, 220A and the height Hh of the hand of the user 10. The height Hc may be equal to the height Hi of the inlets 220, 220A or may be equal to the height Hh of the hand of the user 10.

Further, the height Hc is a height within a range between the height Hi of the inlets 220, 220A and the height Hh of the hand of the user 10. However, the height Hc is not limited to this, and may be any height as long as it is easy for the user 10 to handle. The height Hc may be a height outside the range between the height Hi of the inlets 220, 220A and the height Hh of the hand of the user 10. Further, the height Hc is a height calculated using both the height Hi of the inlets 220, 220A and the height Hh of the hand of the user 10. However, the height Hc is not limited to this, and may be a height calculated using any one of the height Hi of the inlets 220, 220A and the height Hh of the hand of the user 10.

(5) In the above-described embodiment, as described in step S615 in FIG. 6, the ground height Hi of the inlets 220, 220A of the electrified vehicles 200, 200A of the user 10 and the height Hh of the hand of the user 10 are registered in advance in the storage device of the server 600 by the user 10, and handed over to the charging stand 300. However, the ground height Hi and the height Hh are not limited to this, and may be acquired by the charging stand 300 in any way. For example, when the charging stand 300 is reserved, the ground height Hi and the height Hh may be registered from the communication instrument 100 to the server 600 as the user 10 inputs the ground height Hi and the height Hh from the communication instrument 100 or in the electrified vehicle 200 in response to an inquiry from the server 600 to the communication instrument 100 or the electrified vehicle 200, and handed over to the charging stand 300. Further, the ground height Hi and the height Hh may be transmitted from the communication instrument 100 to the charging stand 300 as the user 10 inputs the height Hi and the height Hh by the communication instrument 100 or in the electrified vehicle 200 in response to an inquiry from the server 600 or the charging stand 300 to the communication instrument 100 or the electrified vehicle 200 immediately before the elevating control of the charging stand 300.

(6) In the above-described embodiment, as described in step S615 in FIG. 6, the height Hh of the hand of the user 10 is registered in advance in the server 600 by the user 10. However, the height Hh is not limited to this, and the height Hh may be estimated from the physical information such as the height of the user 10 input by the user 10. Further, the height Hh may be estimated from an image of the user 10 captured by a camera provided in the charging stand 300 or the electrified vehicle 200.

(7) In the above-described embodiment, as described in step S615 in FIG. 6, the ground height Hi of the inlets 220, 220A of the electrified vehicles 200, 200A is registered in the server 600 in advance by the user 10. However, the ground height Hi is not limited to this. The specifications of the vehicle type may be searched using the vehicle type (or model) of the electrified vehicle 200 that is registered in advance or input at the time of reservation by the user 10, and the ground height Hi may be identified from information included in the searched specifications.

(8) In the above-described embodiment, as shown in FIGS. 1 and 2, a specific portion in which the connector 302 is placed when the connector 302 is not connected to the inlets 220, 220A is the storage space 305. However, the present disclosure is not limited to this, and the specific portion may have another structure, for example, a structure such as a hook for hanging the connector 302.

(9) The above-described embodiment can be regarded as the disclosure of the power supply equipment such as the charging stand 300, the disclosure of the power supply system 1 including the power supply equipment and the server 600 or the power supply system including the power supply equipment, the server 600, and the communication instrument 100, and the disclosure of the control method or the control program of the power supply equipment or the power supply system.

SUMMARY (1) As shown in FIGS. 1 and 2, the charging stand 300 is power supply equipment capable of supplying electric power to the electrified vehicles 200, 200A on the ground. The charging stand 300 includes the movable portion 300a, the actuator (for example, the actuator of the elevating device 306), and the control device 308 that controls the actuator. The movable portion 300a includes the connector 302 connected to the inlets 220, 220A of the electrified vehicles 200, 200A and the specific portion (for example, the specific portion may be the storage space 305 or a hook for hanging the connector 302) in which the connector 302 is placed when the connector 302 is not connected to the inlets 220, 220A, and is displaceable between a first position at which the specific portion is stored underground (for example, the position corresponding to the lower limit state) and a second position at which the specific portion is exposed on the ground (for example, the position corresponding to the upper limit state). As shown in FIGS. 2, 5, and 6, the control device 308 adjusts the position of the specific portion when the specific portion is exposed on the ground in accordance with the height Hi of the inlets 220, 220A of the electrified vehicles 200, 200A that are the power supply targets (for example, step S323 in FIG. 6).

With the above, the position of the specific portion in which the connector 302 of the movable portion 300a of the charging stand 300 is placed can be adjusted to a height at which the connector 302 is easily connected to the inlets 220, 220A. As a result, the connector 302 can be easily inserted into the inlets 220, 220A.

(2) As shown in FIGS. 2 and 5 and in steps S615, S311 and S323 in FIG. 6, the control device 308 may acquire the height Hi of the inlets 220, 220A of the electrified vehicles 200, 200A that are the power supply targets (for example, in step S615, step S311), and may adjust the position of the specific portion when the specific portion is exposed on the ground in accordance with the acquired height Hi of the inlets 220, 220A (for example, step S323).

With the above, the height Hc of the specific portion of the movable portion 300a of the charging stand 300 can be adjusted in accordance with the acquired height Hi of the inlets 220, 220A of the vehicles that are the power supply targets. As a result, the height Hc of the specific portion can be adjusted accurately.

(3) As shown in the modification, the control device 308 adjusts the position of the specific portion when the specific portion is exposed on the ground to the height Hc that is substantially the same as the height Hi of the inlets 220, 220A.

With the above, the connector 302 taken out from the specific portion of which height is adjusted to the height Hc that is substantially the same as the height Hi of the inlets 220, 220A can be connected to the inlets 220, 220A without changing the height. As a result, the connector 302 can be more easily inserted into the inlets 220, 220A.

(4) As shown in FIGS. 2 and 5 and steps S615, S311 and S323 in FIG. 6, the control device 308 may acquire information related to the height Hh of the hand of the user 10 of the electrified vehicles 200, 200A (for example, the information may be related to the height of the hand or may be related to the height) (for example, in steps S615, S311), and may adjust the position of the specific portion when the specific portion is exposed on the ground in accordance with the acquired height Hh of the hand of the user 10, in addition to the acquired height Hi of the inlets 220, 220A (for example, in step S323).

With the above, the height Hc of the specific portion of the movable portion 300a of the charging stand 300 can be adjusted in accordance with the acquired height Hh of the hand of the user 10, in addition to the acquired height Hi of the inlets 220, 220A. As a result, the height Hc of the specific portion can be accurately adjusted in consideration of the height Hh of the hand of the user 10.

(5) As shown in FIGS. 2 and 5 and step S323 in FIG. 6, the control device 308 may adjust the position of the specific portion when the specific portion is exposed on the ground to be the height Hc between the height Hi of the inlets 220, 220A and the height Hh of the hand of the user 10 (for example, in step S323).

With the above, the connector 302 taken out from the specific portion of which height is adjusted to the height Hc between the height Hi of the inlets 220, 220A and the height Hh of the hand of the user 10 can be connected to the inlets 220, 220A while the height of the connector 302 is maintained within the range between the height Hi of the inlets 220, 220A and the height Hh of the hand of the user 10. As a result, the connector 302 can be more easily inserted into the inlets 220, 220A in consideration of the height of the hand of the user 10.

In addition, the above-mentioned embodiments may be carried out by appropriately combining all or a part thereof. The embodiments disclosed herein should be considered to be exemplary and not restrictive in all respects. The scope of the present disclosure is shown by the scope of claims rather than the descriptions above, and is intended to include all modifications within the meaning and the scope equivalent to the scope of claims.

What is claimed is:

1. A power supply equipment configured to supply electric power to a vehicle on a ground, comprising:
   a connector that is connected to an inlet of the vehicle;
   a movable portion including a specific portion in which the connector is placed when the connector is not connected to the inlet and displaceable between a position at which the specific portion is stored underground and a position at which the specific portion is exposed on the ground;
   an actuator that displaces the movable portion; and
   a processor configured to
      acquire a height of the inlet of the vehicle to which the electric power is supplied and a height of a hand of a user of the vehicle, and
      adjust the position of the specific portion when the specific portion is exposed on the ground in accordance with the acquired height of the inlet and the acquired height of the hand of the user.

2. The power supply equipment according to claim 1, wherein the processor is further configured to adjust the position of the specific portion when the specific portion is exposed on the ground to a height between the height of the inlet and the height of the hand of the user.

3. A control method of power supply equipment configured to supply electric power to a vehicle on a ground, the power supply equipment including
   a connector that is connected to an inlet of the vehicle,
   a movable portion including a specific portion in which the connector is placed when the connector is not connected to the inlet and displaceable between a position at which the specific portion is stored underground and a position at which the specific portion is exposed on the ground,
   an actuator that displaces the movable portion, and
   a processor that controls the actuator,
the control method comprising:
   acquiring a height of the inlet of the vehicle to which the electric power is supplied and a height of a hand of a user of the vehicle; and
   adjusting a position of the specific portion when the specific portion is exposed on the ground in accordance with the acquired height of the inlet and the acquired height of the hand of the user.

4. The power supply equipment according to claim 1, wherein the processor is further configured to adjust the position of the specific portion when the specific portion is exposed on the ground to a height calculated by adding the acquired height of the inlet and the acquired height of the hand of the user and dividing the sum by two.

5. The power supply equipment according to claim 1, wherein a predetermined height of the inlet and a predetermined height of the hand of the user is registered in advance in an external device of the power supply equipment by the user, and the processor is further configured to
   acquire the registered predetermined height of the inlet and the registered predetermined height of the hand of the user from the external device, and
   adjust the position of the specific portion when the specific portion is exposed on the ground in accordance with the registered height of the hand of the user and the registered height of the inlet of the vehicle to which the electric power is supplied.

6. The power supply equipment according to claim 1, wherein the specific portion is a recessed compartment provided in the movable portion, and the processor is further configured to adjust a position of a bottom surface of the recessed compartment when the recessed compartment is exposed on the ground in accordance with the acquired height of the inlet of the vehicle to which the electric power is supplied and the acquired height of the hand of the user.

* * * * *